United States Patent [19]

Hügenell

[11] Patent Number: 5,430,577
[45] Date of Patent: Jul. 4, 1995

[54] DOUBLE REFLECTOR

[75] Inventor: Hermann Hügenell, Maxdorfer Strasse 47, 6715 Lambsheim, Germany

[73] Assignees: Karl F. Angstenberger, Frankenthal; Hermann Hügenell, Lambsheim, both of Germany

[21] Appl. No.: 916,981

[22] PCT Filed: Dec. 10, 1991

[86] PCT No.: PCT/CH91/00260

§ 371 Date: Sep. 24, 1992

§ 102(e) Date: Sep. 24, 1992

[87] PCT Pub. No.: WO92/10776

PCT Pub. Date: Jun. 25, 1992

[30] Foreign Application Priority Data

Dec. 13, 1990 [DE] Germany .............. 40 39 878.1

[51] Int. Cl.⁶ .............................................. G02B 5/10
[52] U.S. Cl. ................................ 359/846; 359/849; 359/851; 359/853; 359/859; 359/861; 359/868; 359/869
[58] Field of Search ............... 359/845, 846, 847, 848, 359/849, 857, 858, 859, 861, 868, 869, 851, 853, 855, 365, 366

[56] References Cited

U.S. PATENT DOCUMENTS

| 3,140,347 | 7/1964 | Cohen | 359/849 |
| 3,556,630 | 1/1971 | Wilczynski | |
| 4,101,195 | 7/1978 | Korsch | 359/859 |
| 4,724,404 | 2/1988 | Cochran | 359/846 |
| 4,925,301 | 5/1990 | Rafanelli | 359/858 |
| 4,934,805 | 6/1990 | Pinson | 359/859 |
| 4,959,531 | 9/1990 | Marino | 359/849 |
| 5,136,413 | 8/1992 | MacDonald et al. | 359/859 |
| 5,347,401 | 9/1994 | Hugenell | 359/858 |

FOREIGN PATENT DOCUMENTS 1940657  2/1970  Germany .
3119823 12/1982  Germany ................ 359/849
242107  1/1987  Germany .

OTHER PUBLICATIONS

Optical Design Methods, Applications, and Large Optics; Andre Masson et al; SPIE vol. 1013 (1988) pp. 240-248.
Aktive und adaptive Optik in der Astronomie; Von F. Merkle; Physik-Verlag GmbH, 1988; pp. 439-446.
Advanced Technology Optical Telescopes IV; Lawrence D. Barr; SPIE vol. 1236 1990; pp. 85-90.

Primary Examiner—Ricky D. Shafer
Attorney, Agent, or Firm—Bell, Seltzer, Park & Gibson

[57] ABSTRACT

A double reflector is described which comprises two spaced apart primary mirrors oriented toward a common focus. The optical system further comprises two separate secondary deflector mirrors as well as tertiary deflector mirrors for beam concentration on a common focus. Both the primary mirrors and the secondary deflector mirrors are so-called off-axis reflectors, i.e. their surface represent surface sectors of a hypothetical big aspherical mirror body. As surface sectors of a hypothetical big hyperbolic mirror, the primary mirrors are inclined at an angle with respect to the common optical axis and each disposed at a given spacing from the same in such manner that the inner marginal rays of the incident radiation which are closest to the optical axis, will converge. The primary mirrors of over 8 meters in diameter are composed of individual segments which are coupled to corresponding segments of the secondary deflector mirror, which are located opposite them in the beam path, by way of a high-precision computer assisted measuring system such that each deviation of the primary mirror segments in their bearing position is responded to with a corrective movement of the respective opposite segments of the secondary deflector mirror, carried out in real time by way of actuators.

4 Claims, 8 Drawing Sheets

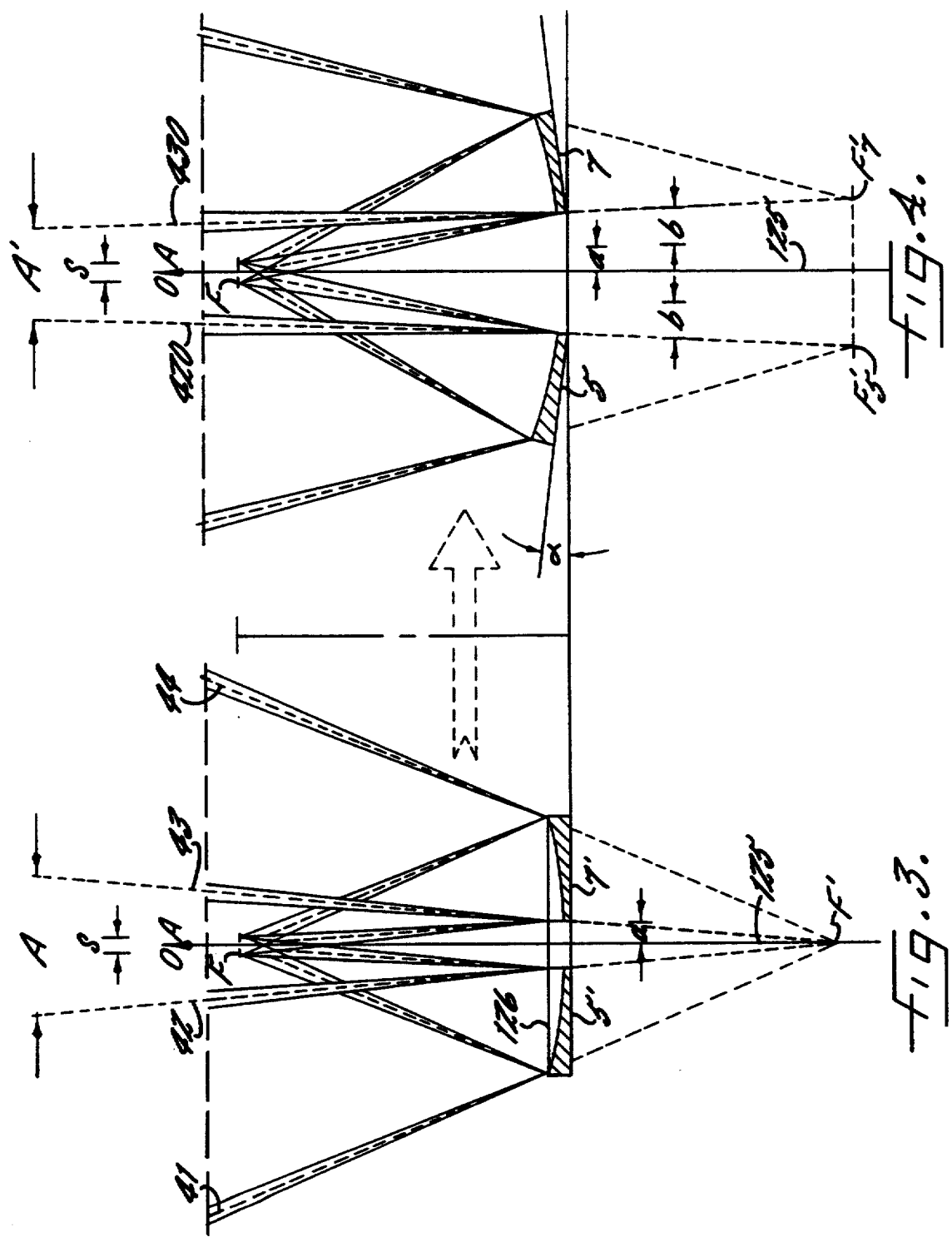

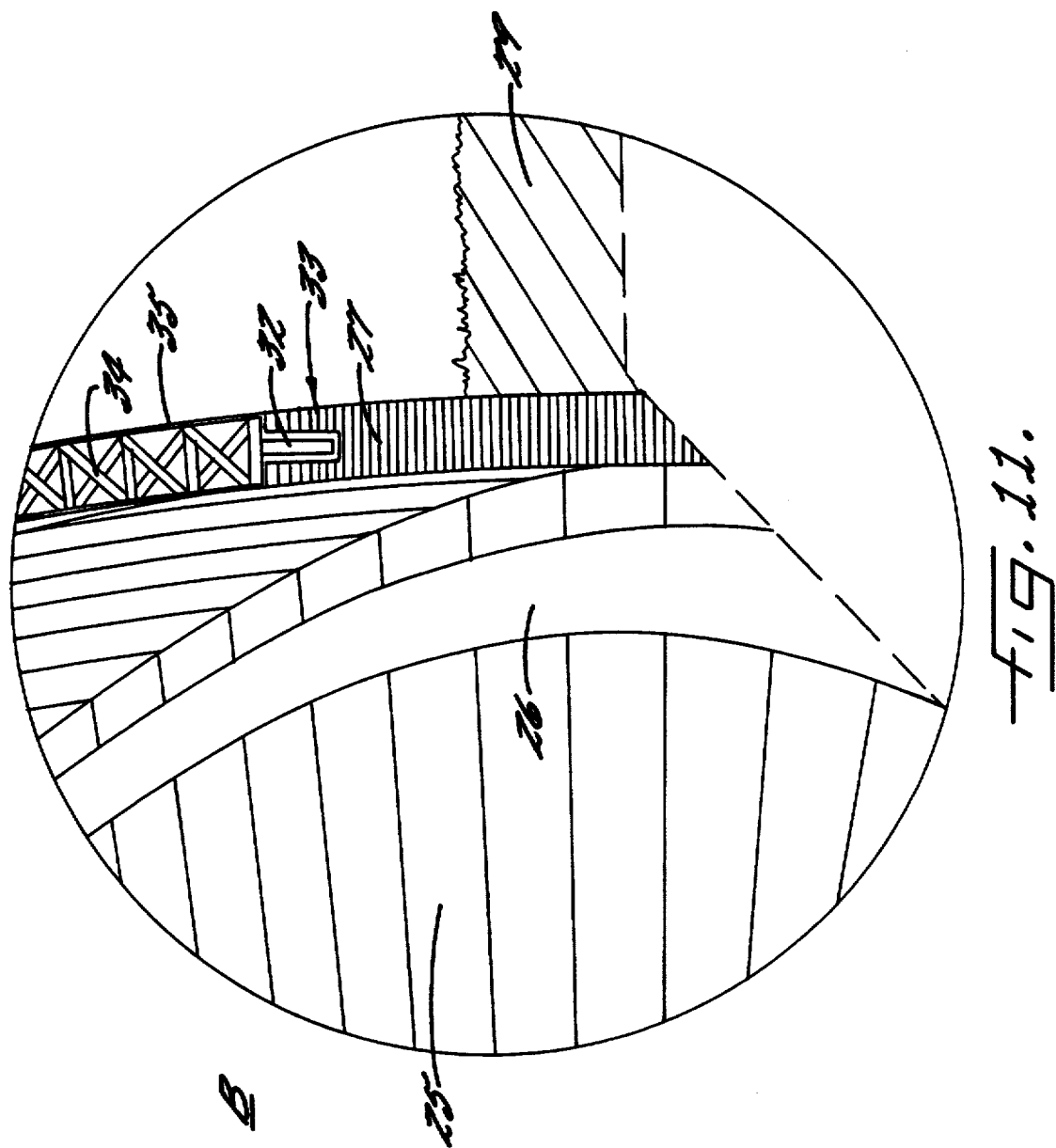

DOUBLE REFLECTOR

The invention relates to a double reflector of the type having two spaced apart primary mirrors oriented toward a common focal point.

Such a double reflector is known from DE-OS 19 40 657. With this known double reflector the primary mirrors as well as the secondary deflector mirror are of monolithic rotationally symmetrical design and that is disadvantageous for the reason that the system poses limitations on the diameter of such mirrors. Another disadvantage is the provision of a single rotationally symmetrical secondary deflector mirror because it reduces the effective light intensity due to the common focussing. Moreover, the secondary deflector mirror is not integrated in the real time measuring and compensating system and that has an unfavorable effect on the image quality to be achieved.

A central-axis reflector comprising a primary mirror whose diameter is 20 m is known from the publication SPIE, vol. 1013 "Optical Design Methods, Applications, and Large Optics" (1988), pages 241–248. This very big primary mirror which can be used also as an off-axis reflector is realized by a plurality of individual segments which are placed in contiguous relationship.

A large telescope including a primary mirror which is deformable with the aid of actuators for correction of the wavefront, with corresponding adaptive compensation measures taking place in real time, is known from the publication Phys. Bl.44 (1988), no. 12, pages 439–446.

It is the object of the invention to improve a double reflector of the kind mentioned initially in respect of the effective light intensity and image quality.

The above and other objects and advantages of the present invention are achieved by the novel features of the present invention as described in detail below.

The invention provides a gain in light intensity by the arrangement of a separate secondary mirror segment which is coordinated with each primary mirror segment and adapted in shape to the respective primary mirror segment. Improved image quality is achieved, according to the invention, in that also the secondary mirror segments are included in the real time measuring and compensating system so that both the primary mirror segments and the secondary mirror segments are separately adjustable.

According to an advantageous further development of the invention the inherent mass of the individual mirrors is reduced by the fact that the mirrors comprise a support structure formed with cavities. A reduced inherent mirror mass furthermore has a favorable effect on the adjustability of the mirrors and thus also on the image quality which is achievable with the double reflector. In this respect it is also advantageous that the mirrors are specifically cooled by a coolant which circulates in the cavities. Another advantage for the image quality to be achieved is the further development of the invention according to which all the mirrors and all the operating and auxiliary means are arranged on a common self-supporting support member which is supported hydrostatically, over a large area, in a tray so as to be rotatable about its axis of elevation and the common optical axis.

The invention will be described in greater detail below with reference to an embodiment illustrated in the drawing. Here the double reflector is used as a mirror telescope.

FIG. 1 diagrammatically shows a vertical cross section of a mirror support system of a mirror telescope comprising two off-axis hyperbolical reflectors;

FIG. 2 diagrammatically shows a top plan view of the mirror support system according to FIG. 1;

FIGS. 3 and 4 each show diagrammatically a cross section of the mirrors and the mirror support system according to FIGS. 1 and 2 with different mirror arrangements;

FIGS. 5 and 6 each diagrammatically show details of the mirror arrangement according to FIG. 4;

FIG. 7 shows a perspective illustration, partly in section, of the reflector support system according to FIGS. 1 and 2, as is applied also with other reflector surface curvatures;

FIG. 8 diagrammatically shows an overall view of a mirror telescope, partly in perspective and partly in section; and FIGS. 9 to 11 each show details A, B, and C of the bearing arrangement according to FIG. 8.

FIG. 1 illustrates a mirror support system 12 of a mirror telescope based on the example of two off-axis hyperbolical reflectors, comprising two primary mirrors (objective) 5 and 7. It is a so-called big telescope, with each primary mirror 5, 7 having a diameter of more than 8 m. Optimum adaptation to the known diffraction effect of the atmosphere surrounding the earth is obtained with aperture diameters of about 15 m.

The reflector support system 12 is supported for rotation about the axis of elevation 120, on the one hand, and about the axis of elongation, on the other hand. For purposes of clarity of presentation, FIG. 1 does not represent the stationary support devices on which the reflector support system rests. They are described in detail in FIGS. 8 to 11.

The reflector support system 12 comprises a closed, substantially self-supporting, bobbin-shaped casing provided with two side-by-side apertures 16, 17 for radiation incidence into the interior on the two primary mirrors 5,7. Moreover, the mirror support system 12 comprises a circular cylinder 10, 13 each at its ends, concentrically with the axis of elevation 120, the outer jacket of each of them serving for low-friction support in the rotational movement about the axis of elevation 120 and access into the casing being permitted through the inner spaces of each of them. An annular shell 11 disposed coaxially with the axis of elevation 120 serves for guidance of the casing and to stabilize the rotational motion of the axis of elevation.

In addition to the two primary mirrors 5, 7, the optical system of the mirror telescope comprises two separate secondary deflector mirrors 2, 3 as well as two separate tertiary deflector mirrors 6 arranged in such a way that the radiation of both primary mirrors 5, 7 is concentrated in a common Nasmith focus 4 on the axis of elevation 120.

The two primary mirrors 5, 6 and the respective associated secondary deflector mirrors 2, 3 are so-called off-axis mirrors, i.e. their surfaces represent surface sectors of a hypothetical, big, aspherical mirror body 126 (FIG. 3); SM (FIG. 7). The region of the incident radiation is marked 123 and 124, respectively, and the virtual foci as well as the primary focus are marked by reference numerals 8, 9, and 1, respectively. In contrast to the secondary deflector mirrors 2, 3, the two tertiary deflector mirrors 6 are of planar design.

Possible primary mirrors for use are so-called off-axis reflectors. Based on the example of two off-axis hyperbolical reflectors, the area 14, 15 of reflection for the primary mirrors 5, 6, each illustrated by hatching, may be seen from the top plan view of FIG. 2 taken in the direction of incident light.

Further details of the optical means will be explained below with reference to FIGS. 3 and 4. The presentation according to FIG. 3 merely serves to explain the final situation of the primary mirrors 5, 6 in the mirror support system 12 demonstrated in FIG. 4. In other words, FIG. 3 is merely a presentation of an intermediate consideration which is convenient for the final concept when two off-axis hyperbolical reflectors are used.

In accordance with this mental step in between, the two primary mirrors 5', 7' each are spaced by a predetermined distance a from the common optical axis (OA) 125 at their edges facing each other. Marked by 126, FIG. 3 further shows the hypothetical, aspherical, rotationally symmetrical primary mirror out of which the two reflectors 5', 7' are "cut", offset by the distance a from the optical axis 125. The hypothetical focus of the hypothetical, aspherical, rotationally symmetrical primary mirror 126 is marked F', while its outer marginal rays which illustrate a great aperture ratio are marked 41 and 44, respectively. They coincide with the outer marginal rays at the outer edges which are remote from each other of the primary mirrors 5', 7'. The inner marginal rays which are incident at the edges facing each other of the primary mirrors 5', 7' are marked 42 and 43, respectively. They define a dead zone A which results from the arrangement in pairs of the two primary mirrors 5', 7' maintaining a spacing in between. The image plane (focus) F of the hypothetical big mirror also is the common image plane of the two primary mirrors 5', 7', necessitated by the system. f indicates the focal length of the hypothetical big mirror or mirror combination of the two primary mirrors 5', 7'. The-image plane F includes a raster dimension s.

The basic curves of the two primary mirrors 5', 7' are absolutely identical since they are "cut out" of the hypothetical big mirror 126 at equally great diameters and the same spacing a from the optical axis thereof. To obtain big-area reflectors, in practice the primary mirrors 5', 7' are composed of individual segments (cf. FIG. 7) each being adjustable individually and in computer aided measurement coupling with the associated secondary deflector mirror segment. For ground-based systems, the segments may be made of quartz. Their support structure comprises cavities through which a fluid may be flooded to keep the temperature intentionally constant, with an exchange of coolant being possible through bores.

To reach the final position illustrated in FIG. 4 with reference to the example of a hypothetical big hyperbolical mirror, the primary mirrors 5, 7 are arranged at a spacing b from the optical axis 125 which is greater than the optical spacing a, as compared to their original hypothetical position in the hypothetical big mirror 126. Moreover, the two primary mirrors 5, 7 are inclined symmetrically with respect to the optical axis 125, each by an angle $\alpha$, such that those marginal rays 420 and 430, respectively, which are closest to the optical axis 125 intersect on the axis at a distance which is greater than the focal length f of the hypothetical big primary mirror 126. In this manner the dead zone A' of observation is eliminated. Furthermore, the superpositioning of the rays reflected by the two primary mirrors 5, 7 results in an object image in the focal plane effected from different angles, thus permitting an interference image of this object within an optimum image raster dimension. For example, a total light intensity of an equivalent, one-piece primary mirror whose diameter is 21,21 m is achieved with a diameter of 15 m of the two primary mirrors 5, 7.

In FIG. 4 the hypothetical foci of these two primary mirrors 5, 7 are marked F'5 and F"7, respectively, if they are off-axis hyperbolic mirrors. If the two primary mirrors are cut out of a hypothetical big parabolic mirror, the tilting at angle $\alpha$ is omitted.

Also the two secondary deflector mirrors 2, 3 originate from a common hypothetical mirror SM (FIG. 7) which would be needed to reflect the light reflected by the hypothetical big mirror 126 to the so-called Cassegrain or Nasmith focus (or other further common foci), *mutatis mutandis* in the same way in which the primary mirrors 5, 7 are derived from the hypothetical big mirror 126. The two secondary deflector mirrors 2, 3 accordingly consist of partial areas of a convexly curved hypothethical mirror surface which are spaced from the optical axis thereof and dimensioned such that they generate the reflection rays of the primary mirrors 5, 7 by way of the tertiary mirrors 6 the desired focus 4 (FIG. 1) or directly a Cassegrain focus CF on the optical axis 125 (FIG. 5).

Based on the example of a primary mirror 5, FIG. 5 further illustrates that not only the two primary mirrors are composed of separately controllable and adjustable honeycomb segments 19 but also the secondary deflector mirrors 2 and 3, respectively, are provided with corresponding segments 19. The segments 18 and 19 which lie opposite to each other in the beam path are coupled by actuators which are in turn controlled by a highly precise measuring system, which is not described in detail, for measuring each relative positional change of the primary mirror segment, with computer assistance, and enabling a corrective displacement in real time to the positioning of the secondary deflector mirror. To keep the presentation clear, FIG. 5 illustrates only one segment 19 and 18 in the primary mirror 5 and the secondary mirror 2, respectively. Also, the actuators for one of the segments 19 of the primary mirror 5 are schematically illustrated at 50 in FIG. 5, it being understood that the segments of the mirror 7 have similar actuators, and that the segments 18 of the secondary mirrors 2 and 3 may have similar actuators.

The figures to be described below essentially relate to the rotatable supporting of the mirror support system 12.

Figure 1:
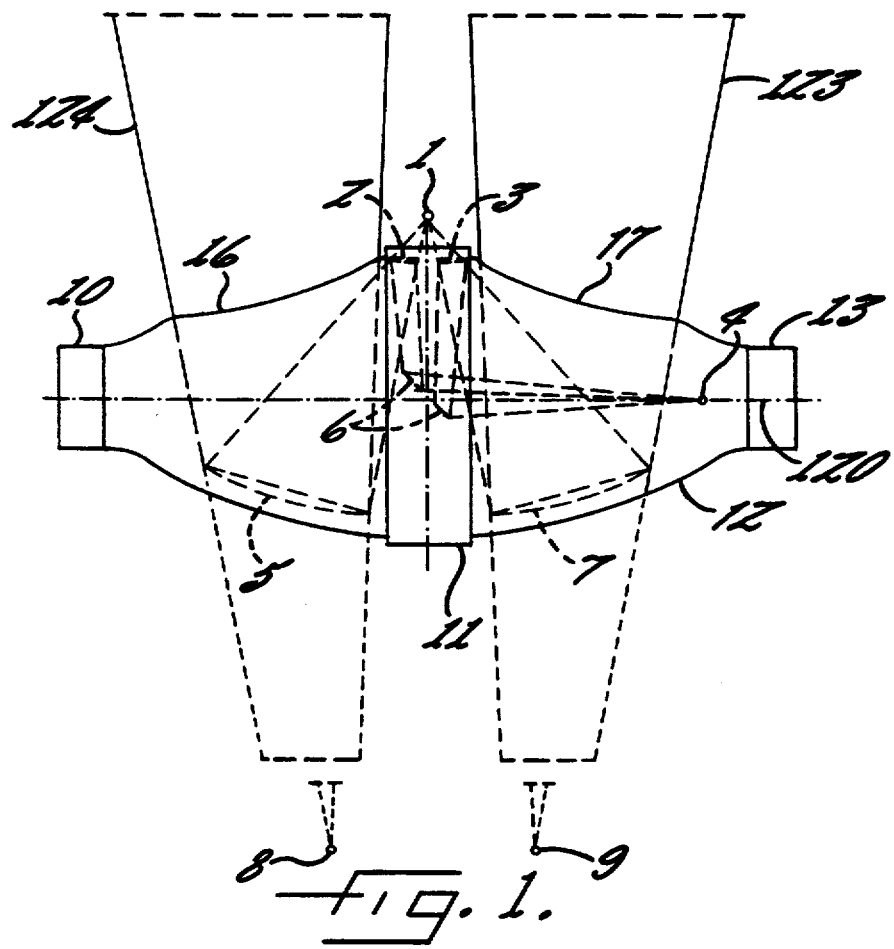
Figure 2:
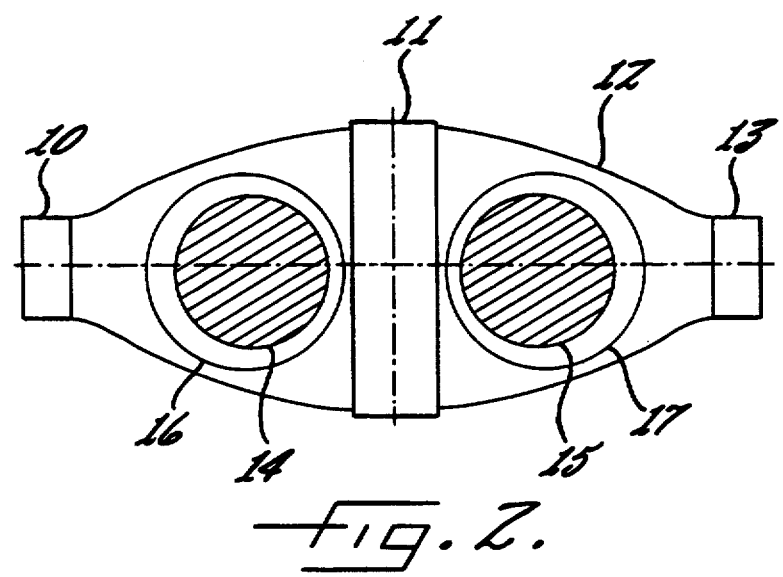
Figure 6:
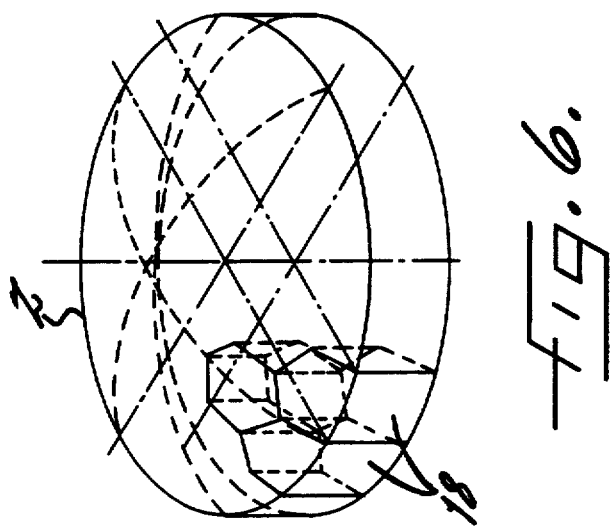
FIG. 6 shows in addition in which manner an uninterrupted mirror surface is obtained by lining up honeycomb elements 18. The precise alignment on the respective focus is effected by means of computer controlled actuators—as mentioned above.
Figure 5:
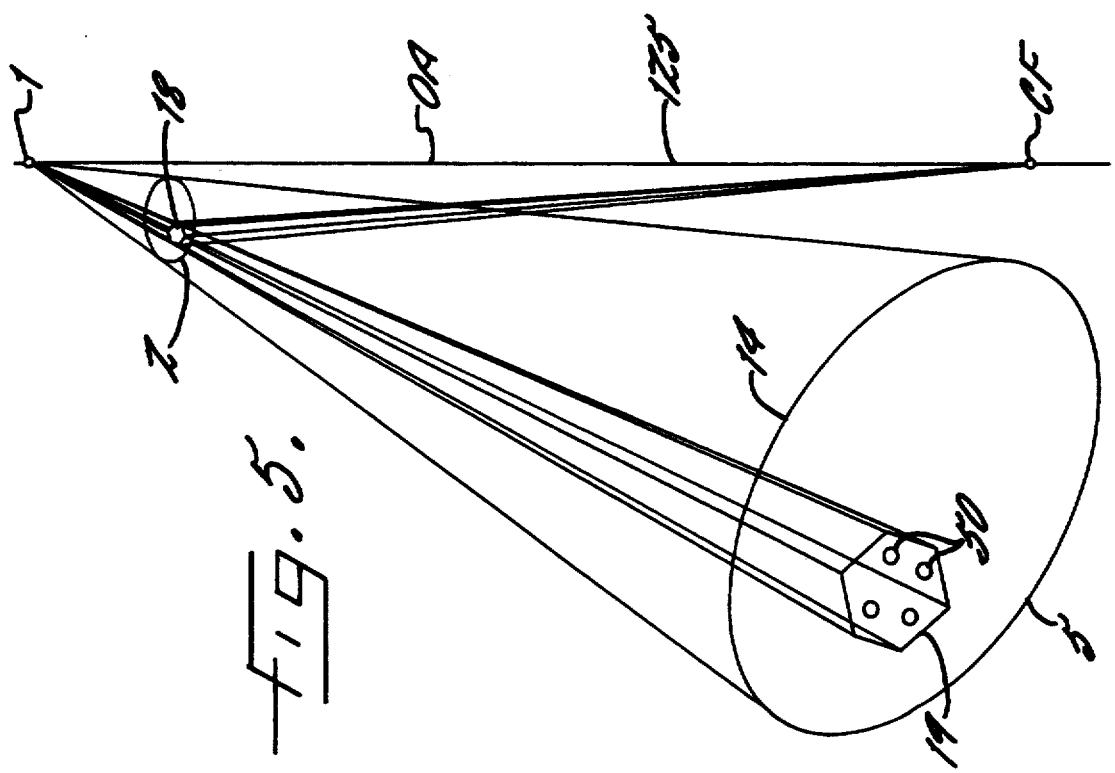
Figure 7:
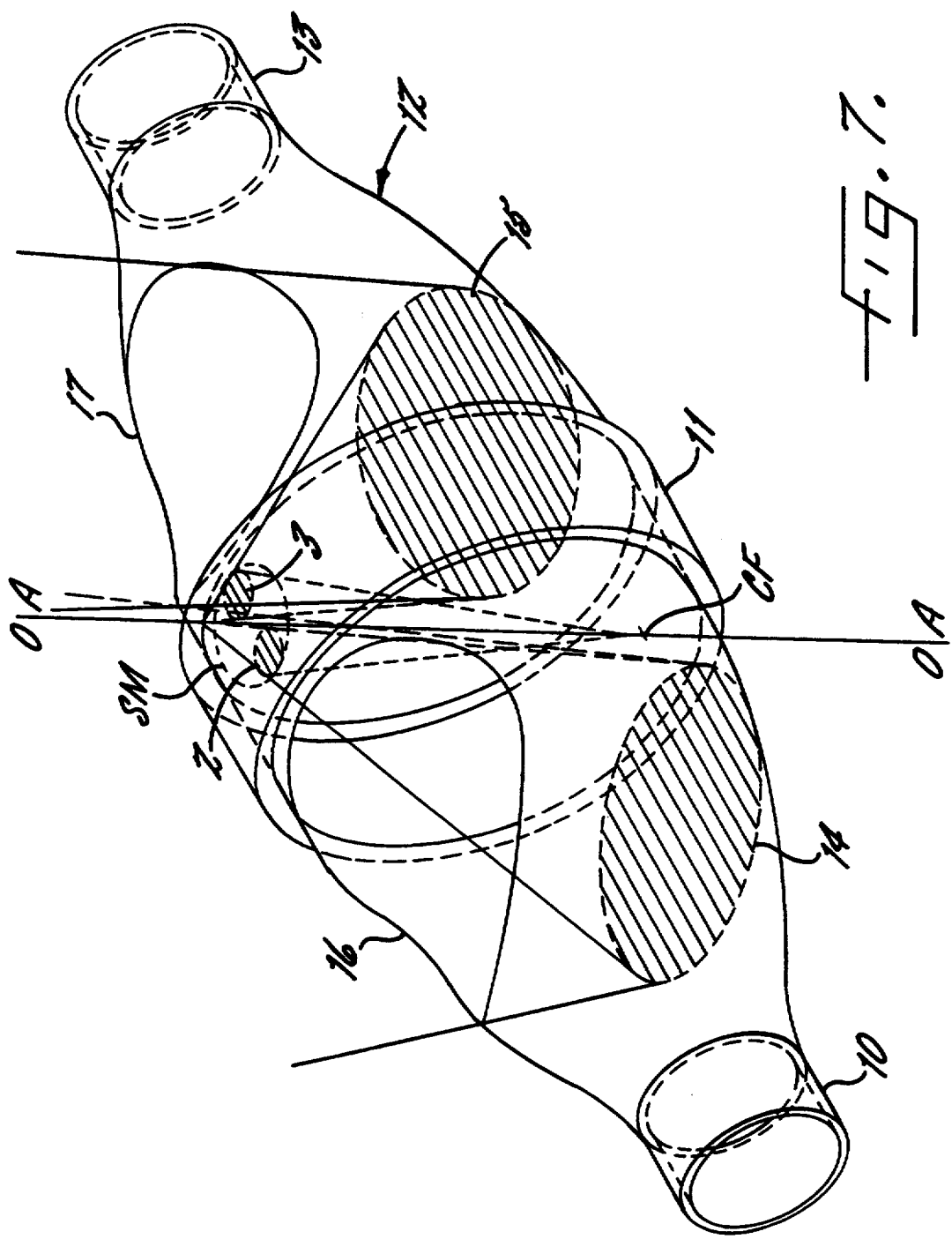
FIG. 7 illustrates, in a perspective presentation, how a mirror arrangement according to FIG. 5 is supplemented to form an arrangement in pairs and inside the mirror support system 12. The hypothetical mirror from which the two secondary deflector mirrors 2, 3 are derived is entered in the drawing, marked SM, to supplement the above explanations.
Figure 8:
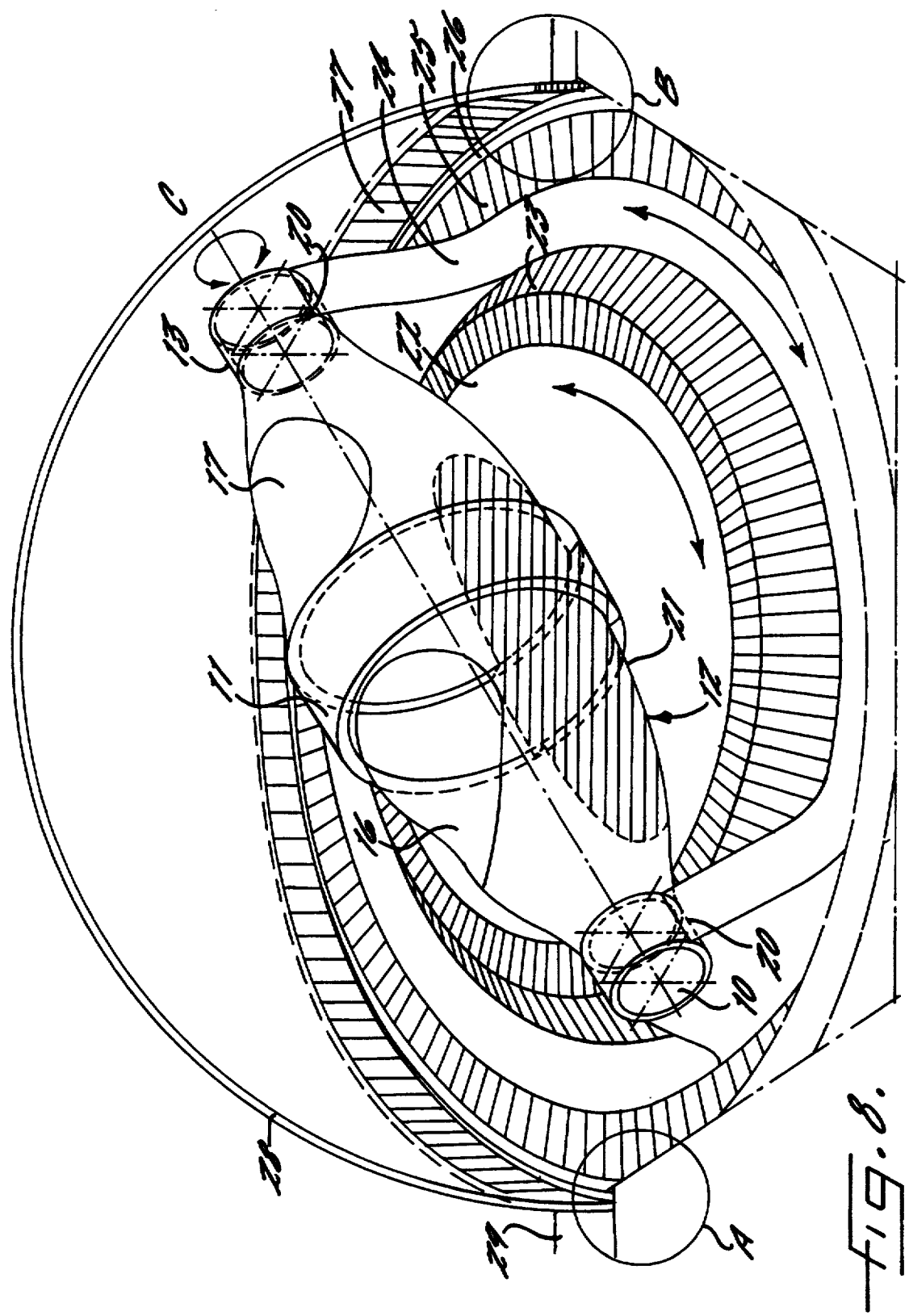

According to FIG. 8 the bobbin-shaped casing of the mirror support system 12 is supported on a liquid film in a tight circular tray 22. The actual liquid bearing area is marked 21. The tray 22 itself again is supported hydrostatically in a concrete bed for rotation in the horizontal plane and is surrounded by a stationary annular concrete shell 23. Together with an outer concrete ring 25 the latter forms a foundation and a concentric guide means for a rotatably supported ring 24 provided with two bushings 20 for the circular cylinders 10, 13 of the mirror support system 12.

Both the ring 24 and the tray 22 each are independently supported hydrostatically so that the effect of their inherent masses becomes negligible. Furthermore, the ring 24 and the tray 22 each are acted upon by a drive by means of which they can be set into rotating motion in the horizontal plane. Both drives are coupled electronically in such manner that the ring 24 serves as master or reference for the tray 22 to control the angular velocity during common rotation about the axis of elongation of the mirror support system 12. The concrete shell 23 makes sure that the rotational drive forces for the ring 24 and the tray 22 do not disturb each other but instead are precisely controllable without any undesirable mutual influence.

With these two separate and electronically coupled bearing and drive systems the tray 22 takes over the main burden of the mirror support system 12. The bearings 20 of the circular cylinders 10, 13 are relieved by comparison. They thus permit precise control of the so-called altazimuthal following in the sky. The annular shell 11 of the mirror support system 12 is provided with another drive means 30 (FIG. 9) for movement about the axis of elevation 120. The shell 11 at the same time also serves to stabilize the rotation of the mirror support system 12. The rotary drive unit 30 is positioned where the mirror support system 12 passes over into its hydrostatic bearing in the tray 22.

Figure 9:
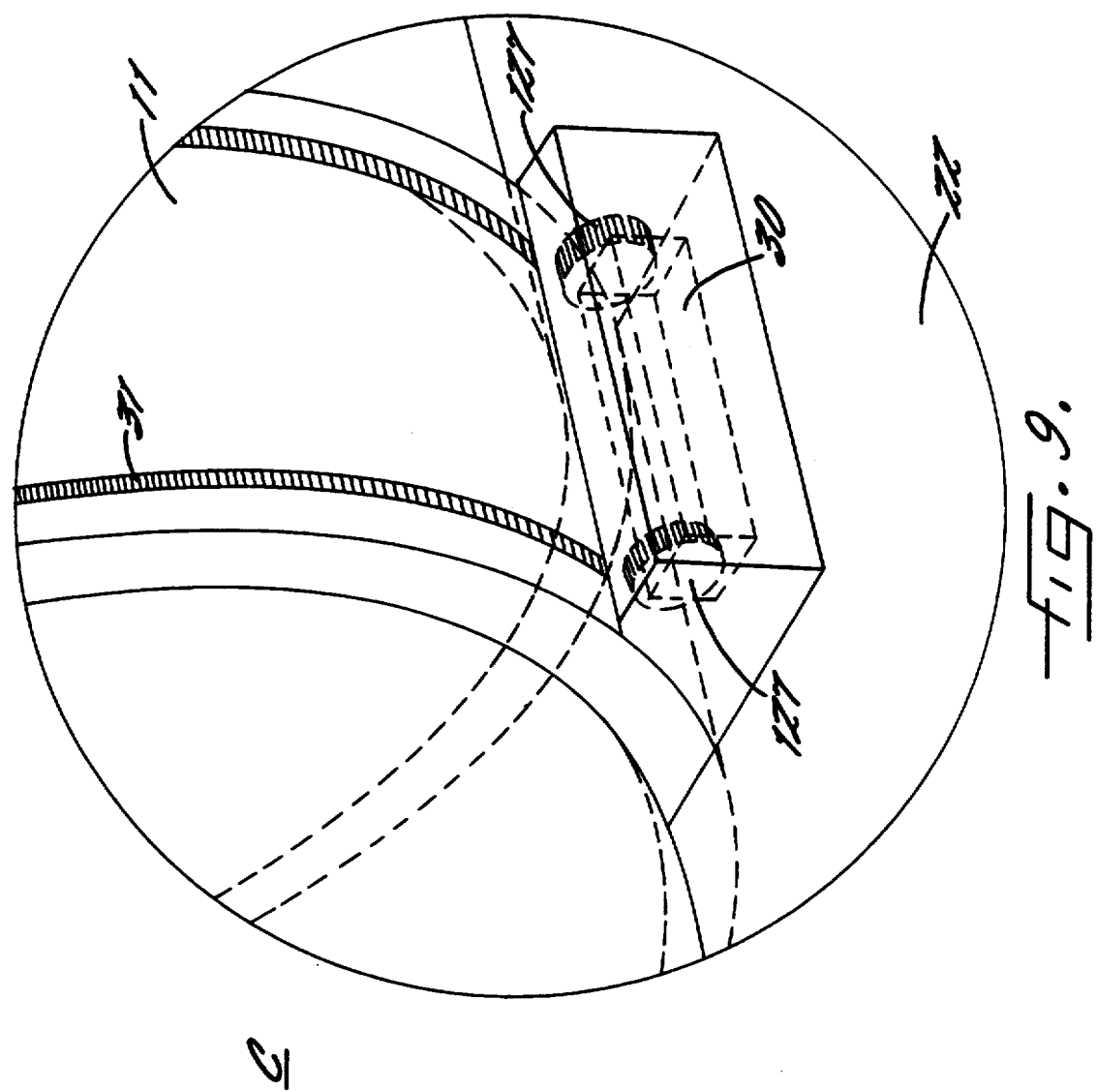

As illustrated in FIG. 9, the rotary drive unit 30 comprises two coaxial drive wheels 127, such as gears, which cooperate with corresponding counterparts or given tracks 31 on the annular shell 11.

FIG. 8 further illustrates that the entire mirror support system 12, the tray 22, and the ring 24, together with the concrete shell 23 and the foundation 25, are roofed by a dome structure (protective cupola) 28 for weather protection. The dome structure 28 is designed as a flat spherical segment and positioned concentrically above the whole assembly. It is adapted to be closed selectively, without leaving any gaps, in the area of slit-like openings (not shown) which are required for the incidence of light, by use of a single closing mechanism, from the zenith position of the telescope down to the lowest angular positioning of the optical apertures towards the horizon. The openings are designed to be slit-like so that a shell surface belonging to the spherical segment extends between these openings. In this manner the closing mechanism experiences stabilization because the spanning closure width provides firm support precisely in the middle and along the closure path.

The dome structure 28 is designed as a flat spherical segment and positioned concentrically above the whole assembly. It is adapted to be closed selectively, without leaving any gaps, in the area of slit-like openings (not shown) which are required for the incidence of light, by use of a single closing mechanism, from the zenith position of the telescope down to the lowest angular positioning of the optical apertures towards the horizon. The openings are designed to be slit-like so that a shell surface belonging to the spherical segment extends between these openings. In this manner the closing mechanism experiences stabilization because the spanning closure width provides firm support precisely in the middle and along the closure path.

The dome structure 28 is hydrostatically supported in a stationary concrete ring 27 for rotation in the horizontal plane.

The mass of the dome structure 28 is taken down into the ground through the annular concrete wall 27.

Figure 10:
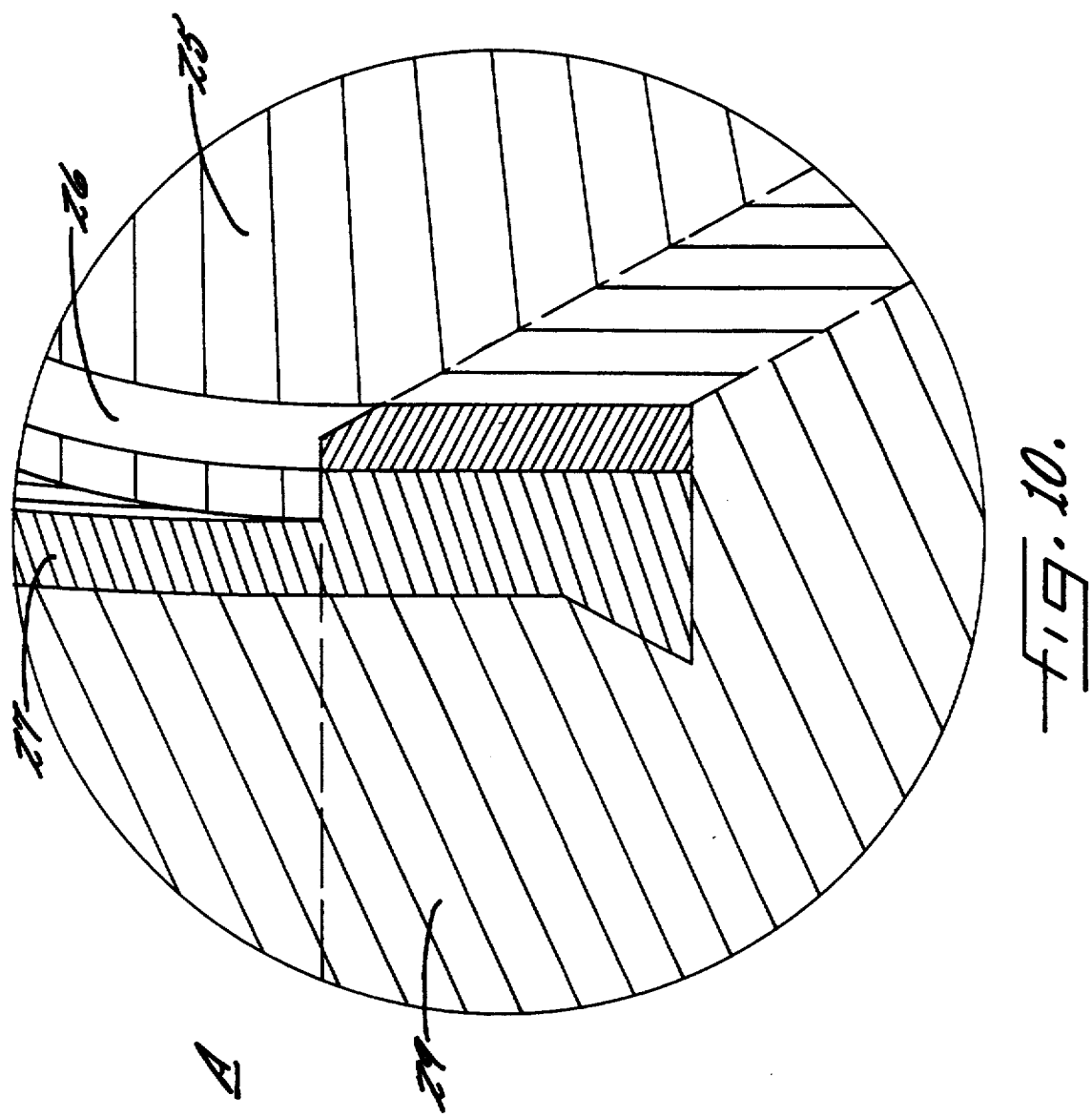

As specifically shown in FIGS. 10 and 11, the concrete ring 27 is separated from the foundation 25 by strong hard rubber-elastic buffers 26 which are disposed in annulus form. 29 designates the ground outside the whole installation.

The dome structure 28 comprises a framework 34 as well as an outer enclosure 35. Guidance of the concrete wall 27 is effected via a bearing base 33 formed in the front end of the concrete wall 27 and engaged by a hollow body 32 disposed at the dome structure 28. The hollow body 32 and the bearing base 33 cooperate hydraulically or pneumatically in such a way that the dome structure 28, when inoperative, rests firmly on the front end of the concrete wall 27. When the dome structure 28 is to carry out rotational motion, the bearing is pressurized hydraulically or pneumatically so that low-friction rotary motion can take place.

Additionally, an inner platform is arranged in the interior of the circular cylinders 10, 13 and is constantly oriented horizontally and supported to suffer only little vibration. It extends so far into the interior of the reflector support system 12 that the instruments and appliances needed for the Nasmith focus can be mounted on it in a manipulation-friendly way.

What is claimed is:

1. A double reflector comprising two spaced apart primary mirrors (5,7) oriented toward a common focus and designed as off-axis reflectors, said primary mirrors each having a pitch surface and each defining a primary mirror beam path, with said pitch surfaces of said primary mirrors corresponding to a pitch surface of a hypothetical large mirror which defines an optical axis (125) which is located between said pitch surfaces of said primary mirrors, with said pitch surfaces of said primary mirrors each comprising a plurality of separately moveable individual segments (19), and with each of said individual segments having a predetermined shape, two secondary deflector mirrors (2,3) positioned in respective ones of said primary mirror beam paths, with each of said two secondary deflector mirrors comprising a partial area of a convexly curved hypothetical mirror surface (SM), with each of said two secondary deflector mirrors comprising a plurality of separately movable individual segments (18), with said individual segments (18) each being optically aligned with a corresponding individual segment (19) of the associated primary mirror, and each of said individual segments (18) having a predetermined shape which represents a reduced replica of said predetermined shape of the corresponding individual segment (19) of the associated primary mirror, and measuring and compensating means associated with each primary mirror and its associated secondary deflector mirror for providing optimum image quality by compensating for relative positional errors, and comprising a plurality of actuators engaging each of said individual segments (19) of said primary mirror and a plurality of actuators engaging each of said individual segments (18) of said secondary mirror, and such that the aligned pairs of an individual segment (19) of said primary mirror and an individual segment (18) of said secondary mirror may be selectively moved with respect to each other.

2. The double reflector as defined in claim 1 wherein said hypothetical large mirror is a hyperbolic mirror having an aperture, wherein the radius of said aperture is defined by a spacing (a) from the optical axis (125), and wherein said primary mirrors (5,7) are each inclined by an angle ($\alpha$) with respect to said optical axis (125), and said primary mirrors are each separated by a spacing (b) from said optical axis which is greater than the spacing (a) of the hypothetical large mirror (126).

3. The double reflector as defined in claim 2, further comprising a support structure (12) mounting said primary mirrors and said secondary deflector mirrors.

4. The double reflector as defined in claim 3 wherein said support structure is supported hydrostatically over a large surface area in a tray (22), and said double reflector further comprises means for selectively rotating said support structure about said optical axis (125) and about an axis of elevation (120) which is substantially perpendicular to said optical axis.

* * * * *